(12) United States Patent
LI et al.

(10) Patent No.: US 12,120,412 B2
(45) Date of Patent: Oct. 15, 2024

(54) IMAGING DEVICE WITH SWITCHABLE FILTERS AND ELECTRONIC DEVICE HAVING THE IMAGING DEVICE

(71) Applicant: TRIPLE WIN TECHNOLOGY(SHENZHEN) CO. LTD., Shenzhen (CN)

(72) Inventors: Kun LI, Jincheng (CN); Jing Guo, Jincheng (CN); Ke-Hua Fan, Jincheng (CN); Ding-Nan Huang, New Taipei (TW)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 49 days.

(21) Appl. No.: 18/070,348

(22) Filed: Nov. 28, 2022

(65) Prior Publication Data

US 2024/0073504 A1 Feb. 29, 2024

(30) Foreign Application Priority Data

Aug. 31, 2022 (CN) .......................... 202211058962.3

(51) Int. Cl.
| | |
|---|---|
| *H04N 23/55* | (2023.01) |
| *G02B 7/00* | (2021.01) |
| *G03B 11/00* | (2021.01) |
| *H04N 23/51* | (2023.01) |
| *H04N 23/54* | (2023.01) |

(52) U.S. Cl.
CPC ............ *H04N 23/55* (2023.01); *G02B 7/006* (2013.01); *G03B 11/00* (2013.01); *H04N 23/51* (2023.01); *H04N 23/54* (2023.01)

(58) Field of Classification Search
CPC ........ H04N 23/55; H04N 23/51; H04N 23/54; H04N 23/00; H04N 23/57; H04N 23/10; H04N 23/11; H04N 23/125; H04N 2209/043; G02B 7/006; G03B 11/00
See application file for complete search history.

(56) References Cited

U.S. PATENT DOCUMENTS

| | | | |
|---|---|---|---|
| 7,738,199 B1 * | 6/2010 | Wen ........................ | G03B 11/00 359/722 |
| 2007/0291157 A1 * | 12/2007 | Ding ...................... | H04N 23/55 348/E5.09 |
| 2010/0172036 A1 * | 7/2010 | Qian .................... | G02B 26/007 359/814 |

(Continued)

FOREIGN PATENT DOCUMENTS

TW M601838 9/2020

*Primary Examiner* — Albert H Cutler
(74) *Attorney, Agent, or Firm* — ScienBiziP, P.C.

(57) ABSTRACT

A simple and integrated imaging device for housing motor-switchable and laterally-moving filters between a camera-lens holder and an imaging chip comprises the switchable filters in a cavity and a switching mechanism, and a driving mechanism are also in the cavity. The imaging chip is carried by a flexible printed circuit board. The driving mechanism connected to the switching mechanism drives the switching mechanism to slide back and forth underneath the camera-lens holder, so that either the first or the second switchable filter covers a through hole allowing light to fall on the imaging chip. An electronic device including the imaging device is also disclosed.

18 Claims, 7 Drawing Sheets

(56) References Cited

U.S. PATENT DOCUMENTS

2013/0148222 A1* 6/2013 Wang .................... G02B 7/006
                                                              359/892
2021/0021771 A1* 1/2021 Kimura ................... G03B 5/02

* cited by examiner

IMAGING DEVICE WITH SWITCHABLE FILTERS AND ELECTRONIC DEVICE HAVING THE IMAGING DEVICE

FIELD

The subject matter herein generally relates to optical devices, and more particularly, to an imaging device and an electronic device having the imaging device.

BACKGROUND

Human eyes can see visible light having wavelengths of 0.38 μm to 0.76 μm in the colors of the rainbow. Light with a shorter wavelength is ultraviolet light, and light with a longer wavelength is infrared light, both are invisible to the human eyes. A filter is an optical component used to allow desired light and block light outside the desired wavelengths. Switching between different filters in a lens module can meet different imaging requirements. However, the existing filter switching device requires external wires and sensors, has a complex structure, and low integration.

Therefore, there is room for improvement in the art.

BRIEF DESCRIPTION OF THE DRAWINGS

Implementations of the present disclosure will now be described, by way of embodiments only, with reference to the attached figures.

DETAILED DESCRIPTION

Some embodiments of the present application will be described in detail below with reference to the drawings. Apparently, the described embodiments are only some of the embodiments of the present application, rather than all the embodiments.

It should be noted that when a component is referred to as being "fixed on" or "mounted on" another component, it may be directly on the other component or there may also be an intervening component. When a component is considered to be "set on" another component, it may be in direct contact with the other component or there may also be an intervening component.

Unless otherwise defined, all technical and scientific terms used herein have the same meaning as commonly understood by persons skill in the art. The terms used herein are only for the purpose of describing specific embodiments, and not intended to limit the embodiments of the present application. As used herein, the term "and/or" includes any and all combinations of one or more of the associated listed items. The terms "vertical", "horizontal", "left", "right", "top", "bottom" and similar expressions are used herein for purposes of illustration only and are not intended to limit the present application.

It can be understood that when describing the parallel or perpendicular arrangement of two components, a tolerance of ±10% is allowed for an included angle between the two components relative to the standard parallel and perpendicular arrangements.

Figure 1:
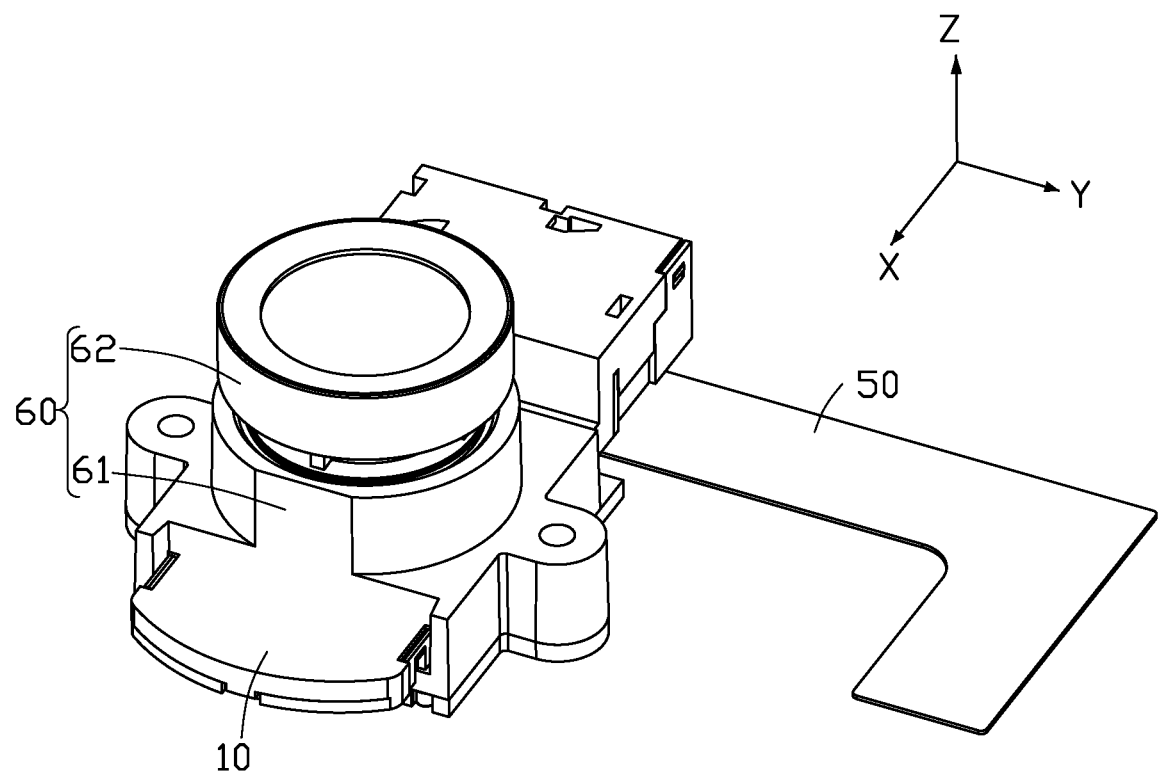
FIG. 1 is a diagrammatic view of an imaging device according to an embodiment of the present disclosure.
Figure 2:
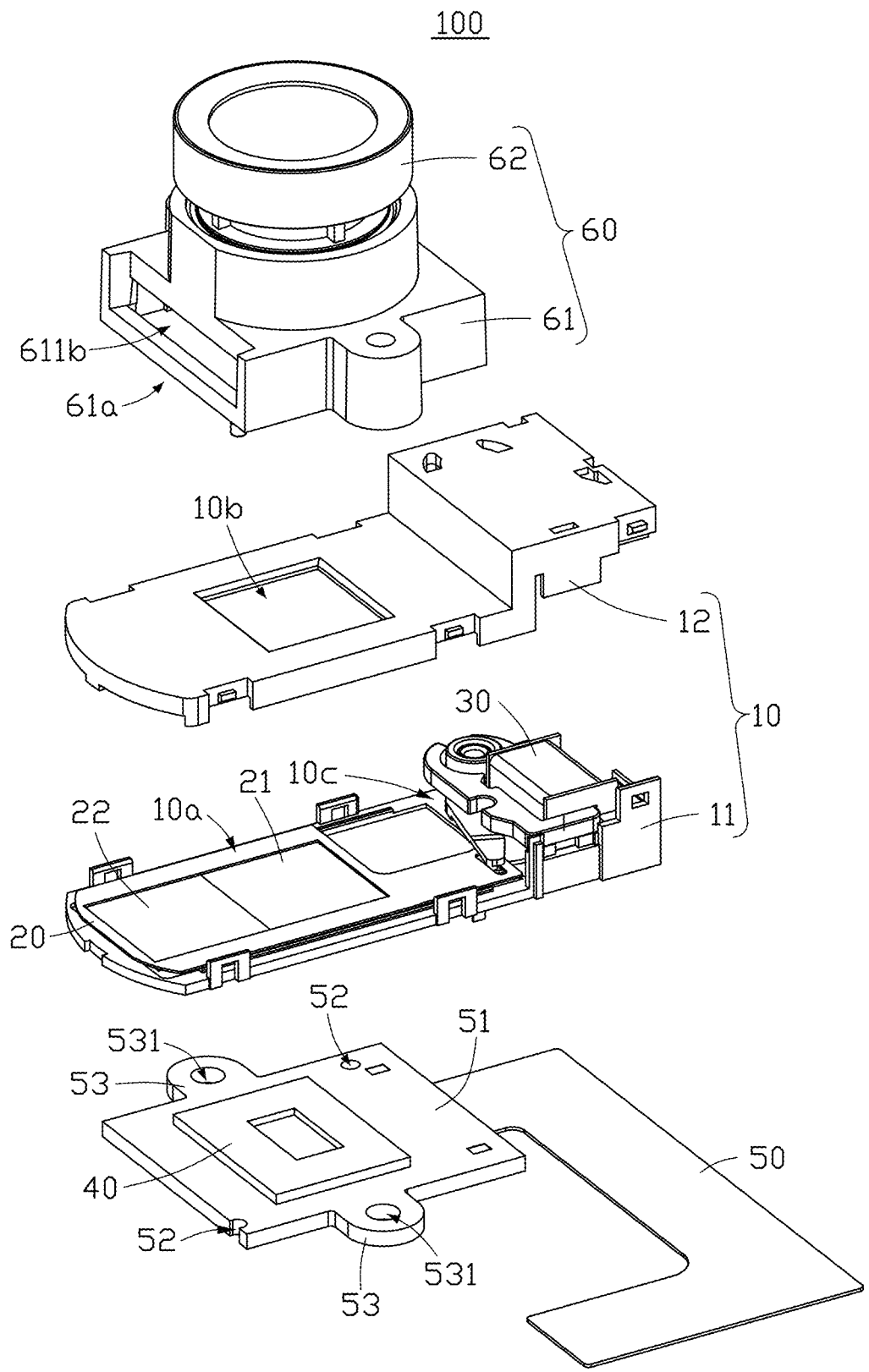
FIG. 2 is an exploded view of the imaging device of FIG. 1.

Referring to FIGS. 1 and 2, an imaging device 100 is provided according to an embodiment of the present disclosure. The imaging device 100 includes a housing 10, a switching mechanism 20, a driving mechanism 30, an imaging mechanism 40, and a flexible printed circuit board 50.

The housing 10 includes a base 11 and a cover 12 opposite to each other along a first direction Z, where the first direction Z is the thickness direction of the base 11 and the cover 12 together. A sliding cavity 10a is formed between the base 11 and the cover 12. The housing 10 also includes a light through hole 10b penetrating the base 11 and the cover 12, and the light through hole 10b communicates with the sliding cavity 10a. The switching mechanism 20 is slidably received in the sliding cavity 10a, and the switching mechanism 20 includes a first filter 21 and a second filter 22 arranged side by side. The first filter 21 and the second filter 22 each allow light of different wavelengths to pass through. The driving mechanism 30 is connected to the switching mechanism 20, and drives the switching mechanism 20 to slide relative to the light through hole 10b, so that only the first filter 21 or the second filter 22 cover the light through hole 10b. The imaging mechanism 40 is arranged on one side of the housing 10 and faces incoming light through hole 10b, and collects light passing through the light through hole 10b, converting it into an electrical signal.

The flexible printed circuit board 50 is arranged on one side of the imaging mechanism 40 away from the housing 10, and is electrically connected to the imaging mechanism 40 and the driving mechanism 30. The flexible printed circuit board 50 includes a first mounting surface 51 facing the housing 10, and the imaging mechanism 40 is integrated on the first mounting surface 51. The flexible circuit board 50 is also electrically connected to an external device (such as a processor, not shown in figures), so as to generate an image from the electrical signal from the imaging mechanism 40. The processor also controls the driving mechanism 30 to drive the first filter 21 or the second filter 22 to cover the light through hole 10b under different conditions (such as ambient light of varying brightness).

In the above-mentioned imaging device 100, the imaging mechanism 40 is integrated on the flexible printed circuit board 50 and electrically connected to the driving mechanism 30, simplifying the structure and improving the integration level of the imaging device 100.

Figure 3:
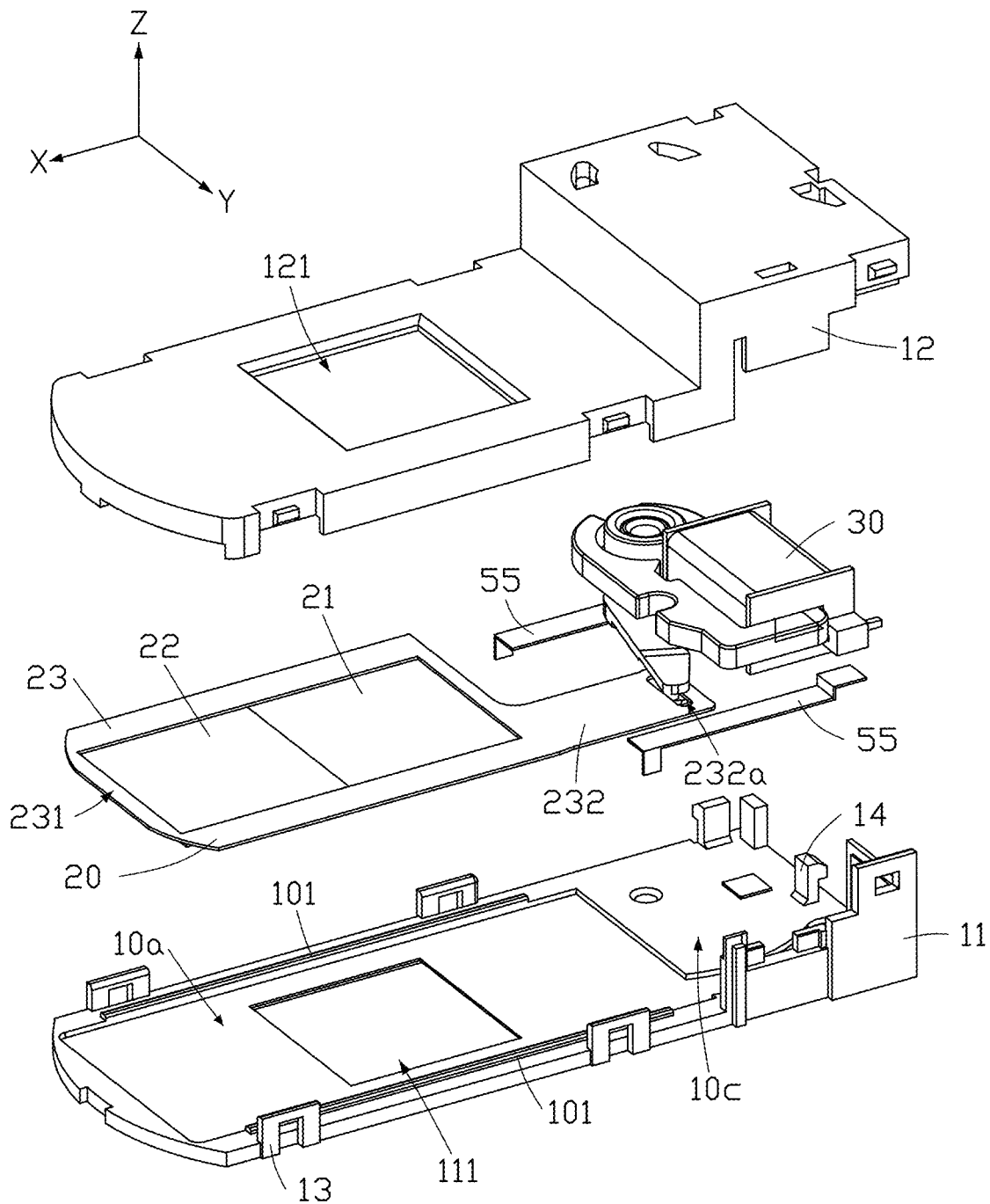
FIG. 3 is an exploded view of a housing of the imaging device of FIG. 2.

Referring to FIG. 3, in some embodiments, the housing 10 further includes a mounting cavity 10c formed between the base 11 and the cover 12. The mounting cavity 10c is disposed on one side of the sliding cavity 10a and used to mount the driving mechanism 30. The mounting cavity 10c also communicates with the sliding cavity 10a, so that the driving mechanism 30 is connected to the switching mechanism 20.

In some embodiments, a first opening 111 is defined on an area of the base 11 corresponding to the sliding cavity 10a, and a second opening 121 is defined on an area of the cover 12 corresponding to the sliding cavity 10a. Projections of the first opening 111 and the second opening 121 in the first direction Z overlap with each other to form the light through hole 10b.

In some embodiments, the housing 10 further includes a plurality of first clamping protrusions 13 connected to the base 11, and the first clamping protrusions 13 are disposed around the periphery of the sliding cavity 10a. The first clamping protrusions 13 enable clamping with the outer side of the cover 12.

In some embodiments, the housing 10 further includes a plurality of second clamping protrusions 14 connected to the base 11, and the second clamping protrusions 14 are disposed around the periphery of the mounting cavity 10c. The second clamping protrusions 14 match the first clamping protrusions 13 for clamping the cover 12 in place.

Referring to FIGS. 3, in some embodiments, the switching mechanism 20 includes a sliding frame 23 slidably connected in the sliding cavity 10a. A window 231 is defined on the sliding frame 23 that penetrates the sliding frame 23. The first filter 21 and the second filter 22 are fixed in the window 231 and arranged side by side in a second direction X. The second direction X is perpendicular to the first direction Z. An extension portion 232 is provided on the sliding frame 23, which extends toward the mounting cavity 10c along the second direction X. A connecting hole 232a is provided on the extension portion 232, and one end of the driving mechanism 30 is movably connected to the connecting hole 232a to drive the sliding frame 23 to slide back and forth along the second direction X.

In some embodiments, the housing 10 further includes two guide strips 101 disposed in the sliding cavity 10a and opposite to each other along a third direction Y. The third direction Y, the second direction X and the first direction Z are perpendicular to each other. Each guide strip 101 extends along the second direction X. The sides of the sliding frame 23 are slidably abutted against the guide strips 101 to guide and contain the sliding of the sliding frame 23 along the second direction X. Thus, the sliding stability of the sliding frame 23 is improved. In some embodiments, the guide strip 101 is disposed on the base 11.

In some embodiments, the first filter 21 is a dual-channel filter for allowing visible light and infrared light to pass through, and the second filter 22 is an ultraviolet filter for allowing only ultraviolet light to pass through.

Infrared light and visible light may be affected by changes in ambient light. Ultraviolet light in nature accounts for a smallest proportion, but the ultraviolet light is not easily affected by changes in ambient light. During use, the first filter 21 allows the visible light to pass through when the brightness of the ambient light (ambient illumination) is greater than a preset value, so as to generate a normal-color image through the imaging mechanism 40. The first filter 21 allows the infrared light to pass through when the brightness of the ambient light is less than the preset value, so as to generate an infrared image through the imaging unit 40. When changes in ambient light prevent the imaging mechanism 40 generating a clear image through the first filter 21, the second filter 22 is used to cover the light through hole 10b to allow the ultraviolet light to pass through, so as to overcome the impact of changes in ambient light on imaging, so that the imaging mechanism 40 generates a clear image. The imaging effect of the imaging mechanism 40 is improved by controlling the driving mechanism 30 to drive either the first filter 21 or the second filter 22 to cover the light through hole 10b under different environmental conditions.

In some embodiments, the imaging device 100 further includes a sensing mechanism (not shown in figures). The sensing mechanism may include a brightness sensor, which is integrated in the flexible printed circuit board 50, and the brightness sensor measures the brightness of the ambient light. When a frequency in change of brightness is lower than a preset threshold, the flexible printed circuit board 50 controls the driving mechanism 30 to drive the first filter 21 to cover the light through hole 10b. When the change is higher than or equal to the preset threshold, the flexible circuit board 50 controls the driving mechanism 30 to drive the second filter 22 to cover the light through hole 10b.

Figure 4:
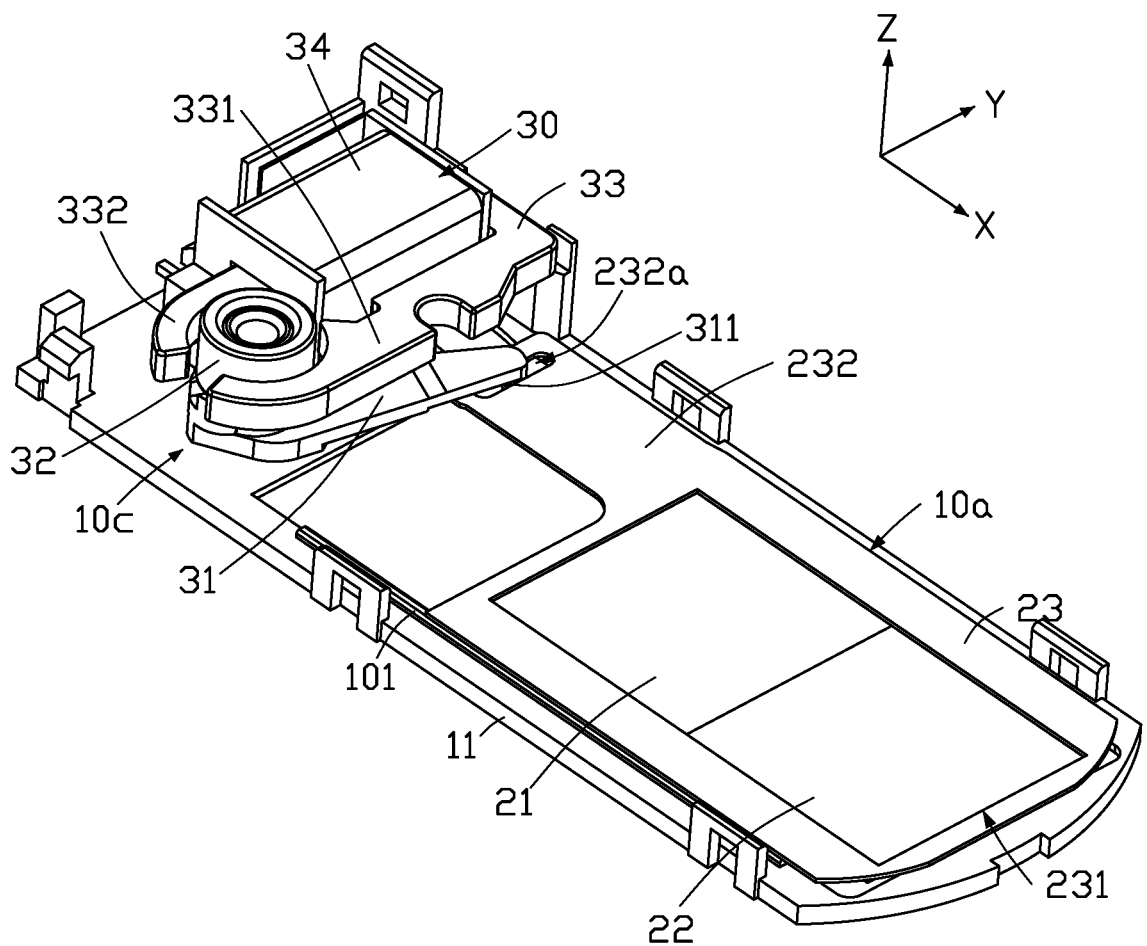
FIG. 4 is a diagrammatic view of a driving mechanism of the imaging device of FIG. 2.

Referring to FIG. 4, in some embodiments, the driving mechanism 30 includes an operation piece 31, a magnet 32, a yoke iron 33, and a coil 34. One end of the operation piece 31 is movably connected to the switching mechanism 20, for example, one end of the operation piece 31 is movably connected to the connecting hole 232a, and the other end of the operation piece 31 is connected to the magnet 32. The magnet 32 is rotatably connected to the housing 10. The two ends of the yoke iron 33 are bent and extended symmetrically to form a first excitation part 331 and a second excitation part 332. The magnet 32 is located between the first excitation part 331 and the second excitation part 332. The coil 34 is wound around the yoke iron 33 and electrically connected to the flexible printed circuit board 50. The flexible printed circuit board 50 controls the direction of the current in the coil 34 to control the magnet 32 to rotate clockwise or counterclockwise. The operation piece 31 is used to drive the switching mechanism 20 along the second direction X relative to the light through hole 10b.

In some embodiments, a connecting pin 311 is provided at an end of the operation piece 31 away from the magnet 32, and the connecting pin 311 passes through the connecting hole 232a. The connecting hole 232a is extended along the third direction Y, and the connecting pin 311 can be inserted in the connecting hole 232a. When the magnet 32 drives the operation piece 31 to rotate, the connecting pin 311 drives the sliding frame 23 move in the second direction X.

In some embodiments, the first filter 21 is near the magnet 32 in the second direction X, and the second filter 22 is away from the magnet in the second direction X. For the second filter 22 to cover the light through hole 10b, the magnet 32 drives the operation piece 31 to rotate counterclockwise to drive the first filter 21 and the second filter 22 to move toward the magnet 32 in the second direction X, so that the first filter 21 is away from the light through hole 10b and the second filter 22 covers the light through hole 10b. While the second filter 22 covers the light through hole 10b, the magnet 32 drives the operation piece 31 to rotate clockwise to drive the first filter 21 and the second filter 22 away from the magnet 32 in the second direction X, so that the second filter 22 is away from the light through hole 10b and so the first filter 21 covers the light through hole 10b.

Figure 5:
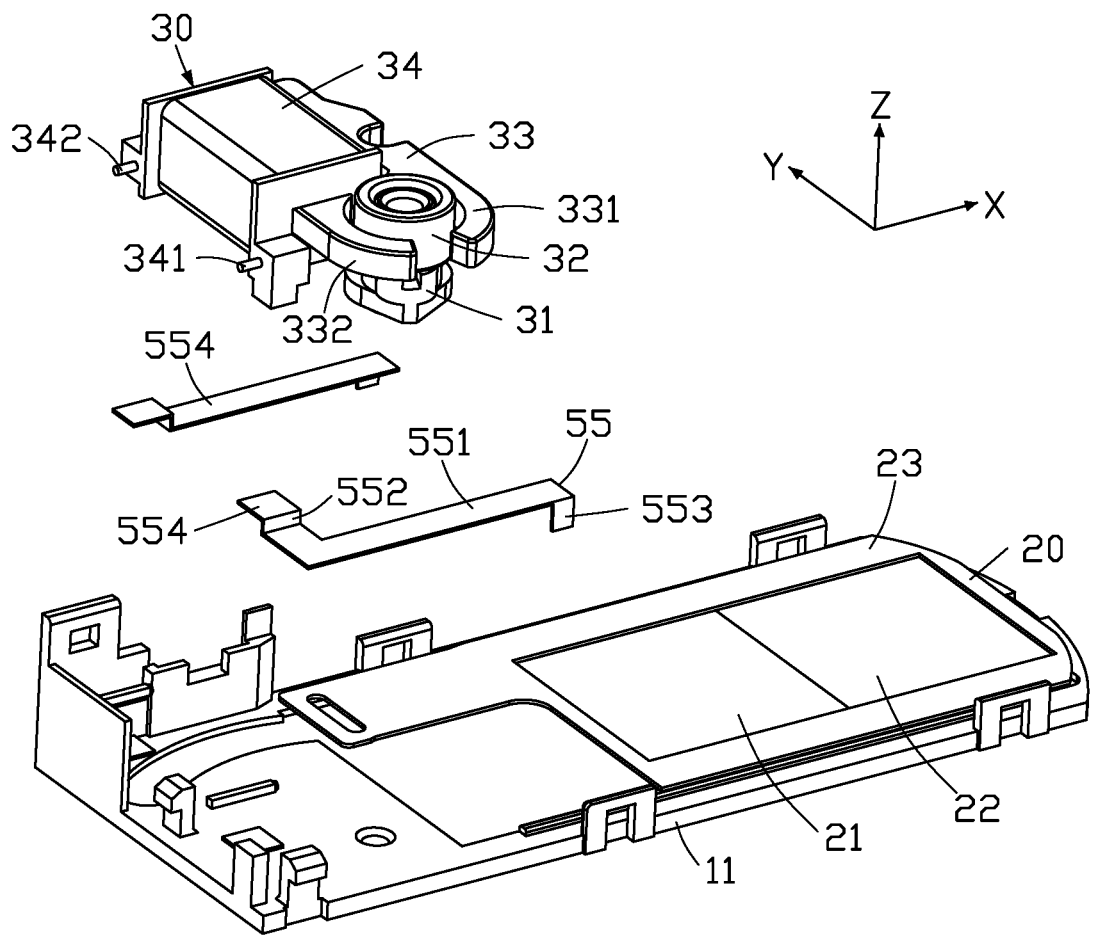
FIG. 5 is a diagrammatic view of a conducting element of the imaging device of FIG. 2.

Referring to FIG. 5, in some embodiments, the coil 34 includes a first end 341 and a second end 342. The imaging device 100 further includes two conducting elements 55. One of the two conducting elements 55 is connected between the first end 341 and the flexible printed circuit board 50, and the other one of the two conducting elements 55 is connected between the second end 342 and the flexible printed circuit board 50. The flexible printed circuit board 50 controls the direction of current in the coil 34 through the conducting element 55. In some embodiments, a converter (not shown) is provided on the flexible printed circuit board 50, and the converter controls the direction of current in the coil 34 through the conducting element 55.

In some embodiments, the conducting element 55 includes a first section 551, a second section 552, and a third section 553. The second section 552 and the third section 553 are connected to two ends of the first section 551. The first section 551 passes through the base 11 and extends along the second direction X, and the first section 551 is insulated from the base 11. The second section 552 extends from the first section 551 along the first direction Z into the mounting cavity 10c to be electrically connected to the coil 34. The third section 553 extends from the first section 551 along the first direction Z to the first mounting surface 51 to be electrically connected to flexible printed circuit board 50.

In some embodiments, the base 11 is made of an insulating material such as plastic, and the conducting member 55 is made of a conductive metal, so that the first section 551 of the conducting member 55 is insulated from the base 11.

In some embodiments, the conducting member 55 further includes a fourth section 554 connected to an end of the second section 552 away from the first section 551. The plane of the fourth section 554 is perpendicular to the first direction Z. The fourth section 554 is electrically connected to the coil 34 to increase the contact area between the conducting member 55 and the coil 34. Thus, the stability of the electrical connection between the conducting member 55 and the coil 34 is improved.

In some embodiments, the imaging mechanism 40 may be, but not limited to, a photosensitive chip, and the photosensitive chip may use a CMOS (Complementary Metal Oxide Semiconductor) sensor or a CCD (charge coupled device) sensor.

Figure 6:
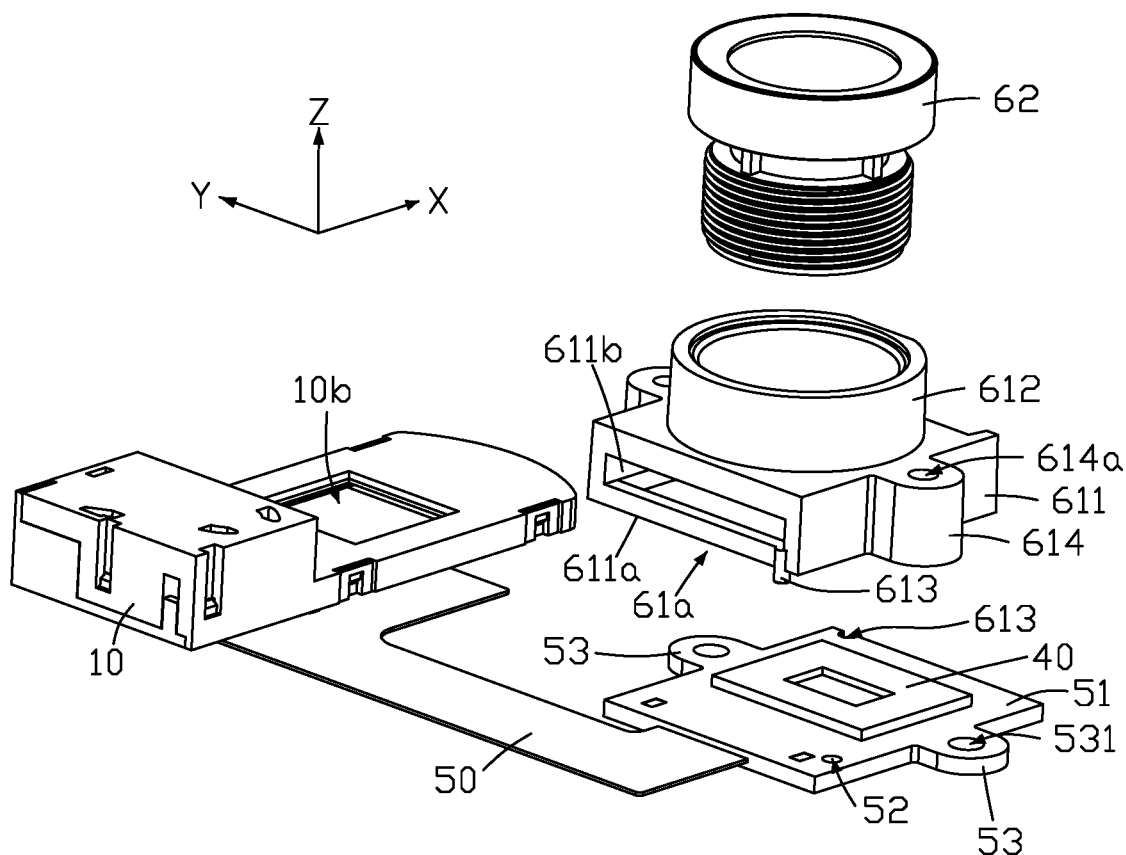
FIG. 6 is similar to FIG. 2, but showing the imaging device from another angle.

Referring to FIGS. 2 and 6, in some embodiments, the imaging device 100 further includes a lens mechanism 60. The lens mechanism 60 includes a lens holder 61 and a lens 62 connected to the lens holder 61. An accommodating cavity 61a is provided on the lens holder 61. The lens holder 61 is connected to the first mounting surface 51, and the imaging mechanism 40 is disposed in the accommodating cavity 61a. The lens 62 faces the imaging mechanism 40 and protrudes from the accommodating cavity 61a along the first direction Z. At least part of the housing 10 protrudes into the accommodating cavity 61a, and the light through hole 10 b is located between the lens 62 and the imaging mechanism 40. The lens 62 receives external light, and the lens 62 passes the light to the light through hole 10b.

In some embodiments, the lens holder 61 includes a main body 611 and a connecting portion 612 sequentially connected along the first direction Z. The lens 62 is connected to the connecting portion 612. The side of the main body 611 away from the connecting portion 612 is provided with a second mounting surface 611a. The second mounting surface 611a is attached to the first mounting surface 51 to improve the stability of the connection between the lens holder 61 and the flexible printed circuit board 50.

In some embodiments, the second mounting surface 611a is connected to the first mounting surface 51 through an insulating glue layer, so as to further improve the stability of the connection between the lens holder 61 and the flexible printed circuit board 50.

In some embodiments, the main body 611 includes two position-limiting holes 611b that are disposed opposite to each other along the second direction X, and the two position-limiting holes 611b communicate with the accommodating cavity 61a. The parts of the housing 10 located on each side of the light through hole 10b are connected to a position-limiting hole 611b, so as to improve the stability of the connection between the lens holder 61 and the housing 10, and to make the structure more compact and facilitate miniaturization of the imaging device 100.

In some embodiments, the flexible printed circuit board 50 further includes a plurality of positioning holes 52 on the first mounting surface 51. The main body 611 includes a plurality of positioning pins 613 protruding from the second mounting surface 611a which can be aligned with the positioning holes 52. The stability of the connection between the lens holder 61 and the flexible printed circuit board 50 is thus improved.

In some embodiments, the flexible printed circuit board 50 further includes two reinforcing portions 53, and the two reinforcing portions 53 are arranged on either side of the first mounting surface 51. The lens holder 61 also includes two fixing portions 614 connected to the two sides of the main body 611, and the fixing portions 614 are connected to the reinforcing portions 53 one-to-one. In some embodiments, a first mounting hole 531 is provided on each reinforcing portion 53, a second mounting hole 614a is provided on each fixing portion 614, and the first mounting hole 531 and the second mounting hole 614a communicate one-to-one with each other and are fastened and connected by fasteners such as bolts.

Figure 7:
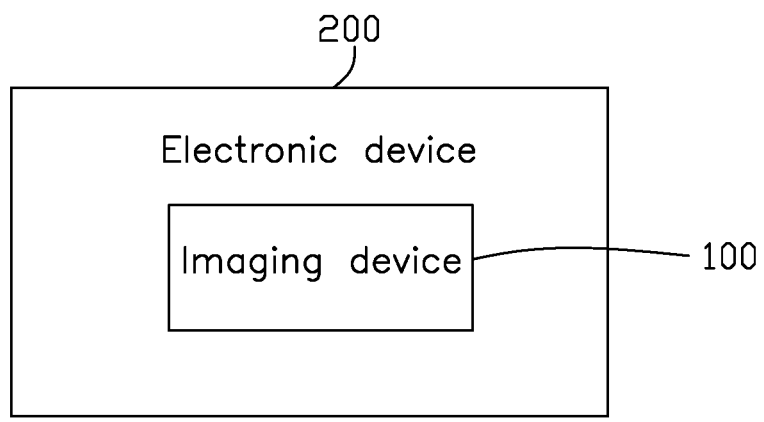
FIG. 7 is a diagrammatic view of an electronic device according to an embodiment of the present disclosure.

Referring to FIG. 7, the present application also provides an electronic device 200 including any imaging device 100 in the foregoing embodiments. The electronic device 200 may be, but not limited to, a face recognition device, a surveillance camera, a digital camera, a network camera, a videophone, a video doorbell, a digital telescope, a vehicle license plate recognition camera, and the like.

Taking the video doorbell as an example, when a brightness is lower than the preset threshold, the flexible printed circuit board 50 controls the driving mechanism 30 to drive the first filter 21 to cover the light through hole 10b, and the imaging mechanism 40 can generate an image with normal color or an infrared image. When a level of brightness is higher than or equal to the preset threshold, the flexible printed circuit board 50 controls the driving mechanism 30 to drive the second filter 22 to cover the light through hole 10b, so as to overcome the effect of ambient light changes on imaging, so that the imaging mechanism 40 generates clear images. The rate of recognition of doorbell-ringers can be improved by the imaging device 100.

In the aforementioned imaging device 100 and electronic device 200, the imaging mechanism 40 is integrated on the flexible printed circuit board 50 and is electrically connected to the driving mechanism 30, which can simplify structure and improve the integration level, compared with the existing manner of using external wires. The flexible printed circuit board 50 controls the driving mechanism 30 to drive either the first filter 21 or the second filter 22 to cover the light through hole 10b under different conditions, which can improve the imaging effect of the imaging mechanism 40.

The above descriptions are some specific embodiments of the present application, but the actual application process cannot be limited only to these embodiments. For those of ordinary skill in the art, other modifications and changes made according to the technical concept of the present application should all belong to the protection scope of the present application.

What is claimed is:
1. An imaging device comprising:
a housing comprising a base and a cover opposite to the base, a sliding cavity formed between the base and the cover, the housing further comprising a light through hole penetrating the base and the cover, the light through hole communicating with the sliding cavity;
a switching mechanism slidably received in the sliding cavity, the switching mechanism comprising a first filter and a second filter each configured to transmit light of different wavelengths;

a driving mechanism connected to the switching mechanism, the driving mechanism configured to drive the switching mechanism to slide relative to the light through hole, so one of the first filter and the second filter covers the light through hole;

an imaging mechanism arranged on a side of the housing and facing the light through hole, the imaging mechanism configured to focus the light transmitted through the light through hole and convert the light into an electrical signal; and a flexible printed circuit board arranged on a side of the imaging mechanism away from the housing and electrically connected to the imaging mechanism and the driving mechanism, the flexible printed circuit board comprising a first mounting surface facing the housing, and the imaging mechanism is integrated on the first mounting surface;

wherein the driving mechanism comprises an operation piece, a magnet, a yoke iron and a coil, an end of the operation piece is movably connected to the switching mechanism, and the other end of the operation piece is connected to the magnet, the magnet is rotatably connected to the housing, and the operation piece is configured to drive the switching mechanism to slide relative to the light through hole, two ends of the yoke iron are respectively bent and extended symmetrically to form a first excitation part and a second excitation part, the magnet is located between the first excitation part and the second excitation part, and the coil is wound around the yoke iron and electrically connected to the flexible printed circuit board, and the flexible printed circuit board is configured to control directions of electric currents in the coil, thereby controlling the magnet to rotate clockwise or counterclockwise.

2. The imaging device of claim 1, wherein the first filter is a dual-channel filter configured for transmitting visible light and infrared light.

3. The imaging device of claim 1, wherein the second filter is an ultraviolet filter configured for transmitting ultraviolet light.

4. The imaging device of claim 1, further comprising a lens mechanism, wherein the lens mechanism comprises a lens holder connected to the first mounting surface; and a lens connected to the lens holder, the lens holder defines an accommodating cavity, the imaging mechanism is arranged in the accommodating cavity, the lens faces the imaging mechanism and protrudes from the accommodation cavity, at least a portion of the housing protrudes into the accommodating cavity, and the light through hole is located between the lens and the imaging mechanism.

5. The imaging device of claim 4, wherein the lens holder comprises a main body and a connecting portion sequentially connected in a first direction, the lens is connected to the connecting portion, a side of the main body away from the connecting portion defines a second mounting surface, and the second mounting surface is attached to the first mounting surface.

6. The imaging device of claim 5, wherein the main body comprises two position-limiting holes which are arranged opposite to each other in a second direction and communicate with the accommodating cavity, and the first direction is perpendicular to the second direction.

7. The imaging device of claim 5, wherein the flexible printed circuit board further comprises a plurality of positioning holes located on the first mounting surface, the main body comprises a plurality of positioning pins protruding from the second mounting surface, and the plurality of positioning pins are connected to the plurality of positioning holes.

8. The imaging device of claim 5, wherein the flexible printed circuit board further comprises two reinforcing portions which are arranged on two sides of the first mounting surface, the lens holder further comprises two fixing portions connected to two sides of the main body, and the two fixing portions are connected to the two reinforcing portions.

9. The imaging device of claim 1, wherein the coil defines a first end and a second end, the imaging device further comprises two conducting elements, one of the two conducting elements is connected between the first end and the flexible printed circuit board, and the other of the two conducting elements is connected between the second end and the flexible printed circuit board.

10. The imaging device of claim 9, wherein each of the two conducting elements comprises a first section, a second section, and a third section, the second section and the third section are respectively connected to both ends of the first section, the first section extends through the base and is insulated from the base, the second section extends from the first section in a first direction and is electrically connected to the coil, the third section extends from the first section in the first direction to the first mounting surface and is electrically connected to the flexible printed circuit board, and the first direction is a thickness direction of the base or a thickness direction of the cover.

11. The imaging device of claim 10, wherein each of the two conducting elements further comprises a fourth section connected to an end of the second section away from the first section, the fourth section is electrically connected to the coil, and a plane where the fourth section is located is perpendicular to the first direction.

12. The imaging device of claim 1, wherein the housing further comprises two guide strips arranged in the sliding cavity and are opposite to each other, the switching mechanism further comprises a sliding frame, and both sides of the sliding frame are slidably abutted against a corresponding one of the two guide strips.

13. The imaging device of claim 12, wherein the sliding frame defines a window penetrating the sliding frame, and the first filter and the second filter are fixed in the window and arranged side by side.

14. The imaging device of claim 13, wherein the sliding frame further defines an extension portion, the extension portion defines a connecting hole, and an end of the driving mechanism is movably connected to the connecting hole to drive the sliding frame to slide.

15. The imaging device of claim 1, wherein the housing further comprises a plurality of first clamping protrusions connected to the base, and the plurality of first clamping protrusions are arranged around a periphery of the sliding cavity and configured to clamp with an outer side of the cover.

16. The imaging device of claim 1, wherein the housing further comprises a mounting cavity formed between the base and the cover, and the mounting cavity is arranged on one side of the sliding cavity and configured to mount the driving mechanism therein.

17. The imaging device of claim 16, wherein the housing further comprises a plurality of second clamping protrusions connected to the base, and the plurality of second clamping protrusions are arranged around a periphery of the mounting cavity and configured to clamp with an inner side of the cover.

18. An electronic device comprising:

an imaging device, the imaging device comprising:
- a housing comprising a base and a cover opposite to the base, a sliding cavity formed between the base and the cover, the housing further comprising a light through hole penetrating the base and the cover, the light through hole communicating with the sliding cavity;
- a switching mechanism slidably received in the sliding cavity, the switching mechanism comprising a first filter and a second filter configured to transmit light of different wavelengths;
- a driving mechanism connected to the switching mechanism, the driving mechanism configured to drive the switching mechanism to slide relative to the light through hole, so that one of the first filter and the second filter covers the light through hole;
- an imaging mechanism arranging on a side of the housing and facing the light through hole, the imaging mechanism configured to collect light transmitted through the light through hole and converting the light into an electrical signal; and
- a flexible printed circuit board arranging on a side of the imaging mechanism away from the housing and electrically connected to the imaging mechanism and the driving mechanism, the flexible printed circuit board comprising a first mounting surface facing the housing, and the imaging mechanism is integrated on the first mounting surface;

wherein the driving mechanism comprises an operation piece, a magnet, a yoke iron and a coil, an end of the operation piece is movably connected to the switching mechanism, and the other end of the operation piece is connected to the magnet, the magnet is rotatably connected to the housing, and the operation piece is configured to drive the switching mechanism to slide relative to the light through hole, two ends of the yoke iron are respectively bent and extended symmetrically to form a first excitation part and a second excitation part, the magnet is located between the first excitation part and the second excitation part, and the coil is wound around the yoke iron and electrically connected to the flexible printed circuit board, and the flexible printed circuit board is configured to control directions of electric currents in the coil, thereby controlling the magnet to rotate clockwise or counterclockwise.

* * * * *